United States Patent [19]

Brunea et al.

[11] Patent Number: 4,639,271

[45] Date of Patent: Jan. 27, 1987

[54] CHROMOGENIC MIXTURES

[75] Inventors: Robert W. Brunea, Grand Island; James M. Raby, Lewiston, both of N.Y.

[73] Assignee: Moore Business Forms, Inc., Grand Island, N.Y.

[21] Appl. No.: 726,484

[22] Filed: Apr. 24, 1985

[51] Int. Cl.[4] .............................................. C09D 11/00

[52] U.S. Cl. ...................................... 106/21; 427/151

[58] Field of Search .................. 106/21; 549/225-227; 427/151

[56] References Cited

U.S. PATENT DOCUMENTS

| | | | |
|---|---|---|---|
| 3,525,630 | 8/1970 | Phillips | 106/21 |
| 3,560,229 | 2/1971 | Farnham et al. | 106/21 |
| 3,849,164 | 11/1974 | Schwab et al. | 346/221 |
| 3,857,675 | 12/1974 | Schwab et al. | 549/225 |
| 3,883,557 | 5/1975 | Farber et al. | 549/225 |
| 3,925,457 | 12/1975 | Tsunemitsu et al. | 549/225 |
| 3,940,275 | 2/1976 | Brockett et al. | 106/19 |
| 3,952,117 | 4/1976 | Miyamoto | 427/150 |
| 4,032,690 | 6/1977 | Kohmura et al. | 428/263 |
| 4,073,614 | 2/1978 | Ozutsumi et al. | 8/644 |
| 4,168,845 | 9/1975 | Oeda et al. | 428/341 |
| 4,180,405 | 12/1979 | Lawton | 106/14.5 |
| 4,197,346 | 4/1980 | Stevens | 428/307 |
| 4,262,936 | 4/1981 | Miyamoto | 427/150 |
| 4,263,047 | 4/1981 | Miyamoto et al. | 106/21 |
| 4,275,906 | 6/1981 | Johnson et al. | 282/27.5 |
| 4,324,817 | 4/1982 | Dahm et al. | 427/150 |
| 4,363,664 | 12/1982 | Delaney | 106/21 |
| 4,376,150 | 3/1983 | Morita et al. | 427/150 |

*Primary Examiner*—Theodore Morris
*Attorney, Agent, or Firm*—Allegretti, Newitt, Witcoff & McAndrews, Ltd.

[57] ABSTRACT

A chromogenic mixture capable of forming a black image with zinc-modified phenolic resins is disclosed that includes an orange chromogen, a green or single component black chromogen and a blue, indigo or violet chromogen.

10 Claims, 2 Drawing Figures

SPECTROPHOTOMETRIC ANALYSIS

Fig. I

CHROMOGENIC MIXTURES

BACKGROUND OF THE INVENTION

1. Field of the Invention

The present invention relates to mixtures of chromogens that are especially useful as color formers in carbonless copying systems.

2. Description of the Prior Art

Chromogenic mixtures that form "black" shades are highly desirable for use in pressure sensitive carbonless recording systems. "Black" images have superior reproduction characteristics when copied by xerographic processes. Additionally, "black" images provide excellent contrast, readability and are similar in appearance to traditional typewritten copy. In the context of carbonless systems, the term "black" refers to shades that range from dark gray to black in appearance and that are characterized by approximately straight line absorption throughout the entire visible range, approximately 400–700 millimicrons.

The traditional carbonless recording system includes a top sheet that is coated on its back surface ("CB") with a multitude of microcapsules containing a marking liquid and a bottom sheet coated on its front ("CF") with an acidic material, such as an acidic clay or a phenolic resin, that reacts with the normally colorless marking fluid upon rupture of the CB microcapsules to form an image on the CF. The marking fluid contained in the microcapsules coated on the CB is typically a mixture of chromogenic materials dissolved within a carrier oil or fluid.

Zinc-modified phenolic resins are now widely favored as the acidic material coated on the CF. This is due to their high reactivity, stabilizing effect on the formed images with respect to light and dark exposure and their low abrasiveness on paper coating equipment. However, zinc-modified phenolic resins display an unexpected inability to synergistically react with many mixtures of two or more chromogens. Rather, most blends of chromogens when imaged on zinc-modified phenolic resins show antagonism with respect to the imaging properties of each other resulting in undesirable shades, poor intensity, or both. This antagonism problem is particularly evident in chromogenic blends intended to form "black" images.

To date, the traditional solution to this problem has been the use of so-called "single component black" precursors. These chromogens are generally blackish green colored fluorans that are used alone or in combination with small amounts (5%–20% by weight) of toner chromogens in order to achieve a preferred "black" shade and to avoid the blending antagonism caused by zinc-modified phenolic resins. However, the use of "single component blacks" is undesirable from a commercial standpoint since they are generally quite expensive and must be applied in relatively large amounts. Thus, there is a need for a chromogenic mixture that will produce a "black" shaded image with zinc-modified phenolic resins while avoiding the antagonistic blending characteristics of such resins and at the same time eliminating or substantially reducing the amount of "single component black" chromogen used.

Most chromogenic mixtures include crystal violet lactone (3,3-bis(p-dimethylamino phenyl), 6-dimethyl amino phthalide) as one of the chromogenic components. For example, U.S. Pat. Nos. 4,376,150 (Morita et al.); 4,180,405 (Lawton); and 4,168,845 (Oeda et al.) all disclose chromogenic mixtures including, inter alia, CVL and a green chromogen. U.S. Pat. Nos. 4,363,664 (Delaney); 4,324,817 (Dahm et al.); 4,275,906 (Johnson et al.); 4,263,047 (Miyamoto et al.); 4,262,936 (Miyamoto); 4,197,346 (Stevens); 4,032,690 (Kohmura); 3,952,117 (Miyamoto); 3,940,275 (Brockett et al.); and 3,560,229 (Farnham et al.) all disclose chromogenic mixtures including, inter alia, CVL and various other fluoran homologs, isomers and analogs. These blends, however, suffer from antagonism problems when imaged on zinc-modified phenolic resins. In addition, the blends disclosed in the Brockett et al are blue, not black. U.S. Pat. Nos. 3,857,675 (Schwab et al.) and 3,849,164 (Schwab et al.) both teach blends of essentially green and red chromogens to produce a "black" shade that avoid the use of CVL entirely. See also U.S. Pat. No. 4,073,614 (Ozutsumi et al.).

SUMMARY OF THE INVENTION

It is an object of the present invention to provide a mixture of chromogens capable of forming a "black" shade when reacted with a zinc-modified phenolic resin in a carbonless copy system.

It is a further object of the present invention to provide a substantially colorless marking liquid composition containing a mixture of chromogens dissolved in an organic oil that is capable of producing a "black" image when reacted with a zinc-modified phenolic resin in a carbonless copy system.

It is a specific object of the present invention to provide a chromogenic mixture that includes at least three components. The first chromogenic component is an orange chromogen having the following formula:

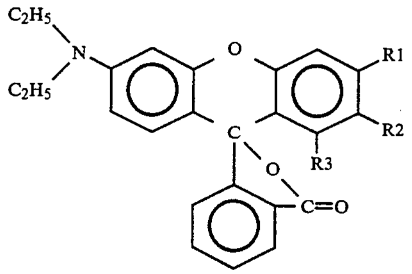

where R1, R2, and R3 are alkyl groups having 1–5 carbon atoms or hydrogen or combinations thereof. This orange chromogen should be present in the chromogenic mixture in an amount of approximately 10% to 60% by weight based on the total weight of the mixture. The second component of the inventive chromogenic mixture is a blue, indigo or violet chromogen that should be present in an amount of approximately 5% to 60% by weight. The third chromogenic component is a green or single component black chromogen that is present in the mixture in an amount of approximately 30% to 70% by weight.

Further objects and embodiments of the present invention will become clear in the following description of the preferred embodiments and claims.

DESCRIPTION OF THE PREFERRED EMBODIMENTS

Figure 1:
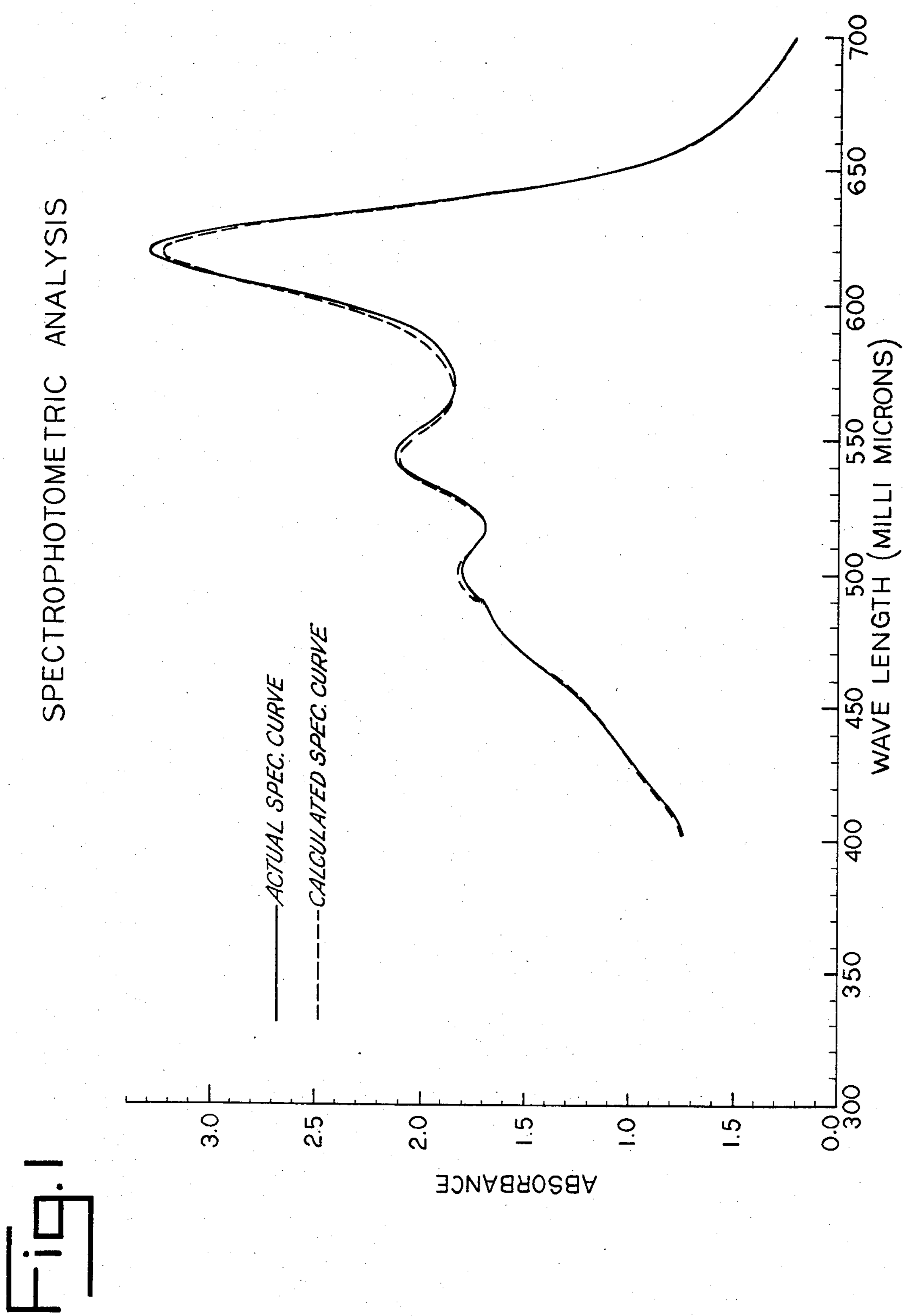
FIG. 1 displays the spectrophotometric analysis in the visible range of the preferred embodiment disclosed in Example 1.

The orange chromogens that may form the first component of the inventive chromogenic mixture, alone or in combination, all have the following formula:

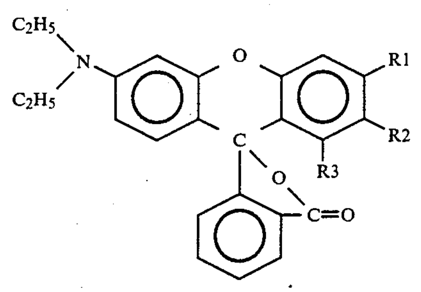

where R1, R2, and R3 are alkyl groups having 1-5 carbon atoms or hydrogen or combinations thereof. A most preferred orange chromogen has R1 and R3 as methyl groups and R2 as hydrogen. Its technical name is 6'-diethyl amino, 1',3'-dimethyl fluoran. Another preferred orange chromogen has R1 as methyl and R2 and R3 as hydrogen. Its technical name is 6'-diethyl amino, 3'-methyl fluoran. A third preferred orange chromogen has R2 as a tert-butyl group and R1 and R3 as hydrogen. Its technical name is 2'-t-butyl, 6'-diethyl amino fluoran. The orange chromogen should be present in the chromogenic mixture in an amount from approximately 10% to 60% based on the total weight of the chromogenic mixture. Most preferably the orange chromogen may be present in an amount from 24% to 35% by weight.

With respect to the blue, indigo or violet chromogen, three preferred candidates, which may be used alone or in combination, are crystal violet lactone, 6-dimethylamino, bis(3-dimethylaminophenyl, 1,3, dimethylaminophenyl)phthalide and 1',3',6',8' tetra(dimethylaminophenyl)phthalide. Most preferably, crystal violet lactone is used as the blue, indigo or violet chromogen since it is highly reactive, widely available and relatively low in cost. The blue, indigo or violet chromogen should be present in an amount of approximately 5% to 60% based on a total weight of the chromogenic mixture. Most preferably, the blue, indigo or violet chromogen may be present in an amount of approximately 10% to 20% by weight.

With respect to the green or single component black chromogen that forms the third component of the inventive chromogenic mixture, there are four preferred compounds, which may be used alone or in combination. The first is a single component black chromogen, 2'-(phenylamino), 3'-methyl, 6'-(N-ethyl, N-p-tolylamino)fluoran. The second is a green chromogen, 2'(N-methyl, N-phenylamino), 6'-(N-ethyl, N-p-tolylamino) fluoran. These two chromogens are the most preferred green or single component black chromogens.

The third preferred chromogen is a green chromogen, 2'-(bis-phenyl methylamino), 4'-methyl, 6'-diethylamino fluoran. The fourth chromogen is a single component black chromogen, 2'-phenylamino, 3'-methyl, 6'(N-methyl, N-cyclohexylamino)fluoran. The selected green or single component black chromogen may be present in the inventive chromogenic mixture in an amount of approximately 30% to 70% based on the total weight of the mixture. Most preferably, the selected green or single component black chromogen may be present in an amount from 45% to 60% by weight.

To form the inventive chromogenic mixtures, one or more of the chromogens from each of the three classes is selected and the chromogens are mixed together in the indicated amounts. In the context of carbonless copy systems, the chromogenic mixtures will generally by dissolved in an appropriate organic oil vehicle that is then microencapsulated and coated as a CB. Any of the numerous organic solvents or oils generally known in the carbonless art may be used to make a colorless marking liquid composition with the inventive chromogenic mixtures, e.g., diisopropyl napthalene, diaryl ethane and diaryl methane.

EXAMPLE 1

A chromogenic mixture was prepared containing 35% 6'-diethyl amino, 1',3'-dimethyl fluoran, 20% crystal violet lactone, and 45% 2'(N-methyl, N-phenylamino), 6'-(N-ethyl, N-p-tolylamino)fluoran based on the total weight of the chromogenic mixture. This mixture was then dissolved in an appropriate organic solvent in an amount of approximately 7% by weight based on the total weight of the solution to form a colorless liquid marking composition. This marking composition was microencapsulated, coated on paper as a CB and then imaged against a CF coated with zinc-modified phenolic resin as the reactive acidic material. The absorbance values shown in Table 1 were obtained on the Bausch & Lomb Opacimeter and the Hunter colorimeter for the formed images.

TABLE 1

| B & L OPACIMETER | | | HUNTER COLORIMETER | | |
|---|---|---|---|---|---|
| Immediate | 20 min. | 24 hr. | L | a | b |
| 76.8 | 44.7 | 36.3 | 54.0 | +4.4 | −6.0 |

The liquid marking composition also exhibited absorbance throughout the visible range, approximately 400 to 700 millimicrons, as shown in FIG. 1.

EXAMPLE 2

A second chromogenic mixture was formed with 24% 6'-diethylamino, 1',3'-dimethyl fluoran, 16% crystal violet lactone, and 60% 2'-(phenylamino), 3'-methyl, 6'-(N-ethyl, N-p-tolylamino) fluoran based on the total weight of the chromogenic mixture. This chromogenic mixture was then dissolved in an appropriate organic solvent to form a colorless liquid marking composition having approximately 6% chromogenic mixture based on the total weight of the solution. The solution was also microencapsulated, coated on paper as a CB and then imaged against a CF coated with zinc-modified phenolic resin to form "black" appearing images. The images yielded the values shown in Table 2 on the B & L Opacimeter and the Hunter colorimeter.

TABLE 2

| B & L OPACIMETER | | | HUNTER COLORIMETER | | |
|---|---|---|---|---|---|
| Immediate | 20 min. | 24 hr. | L | a | b |
| 73.9 | 41.2 | 34.1 | 53.4 | +4.4 | −4.9 |

Figure 2:
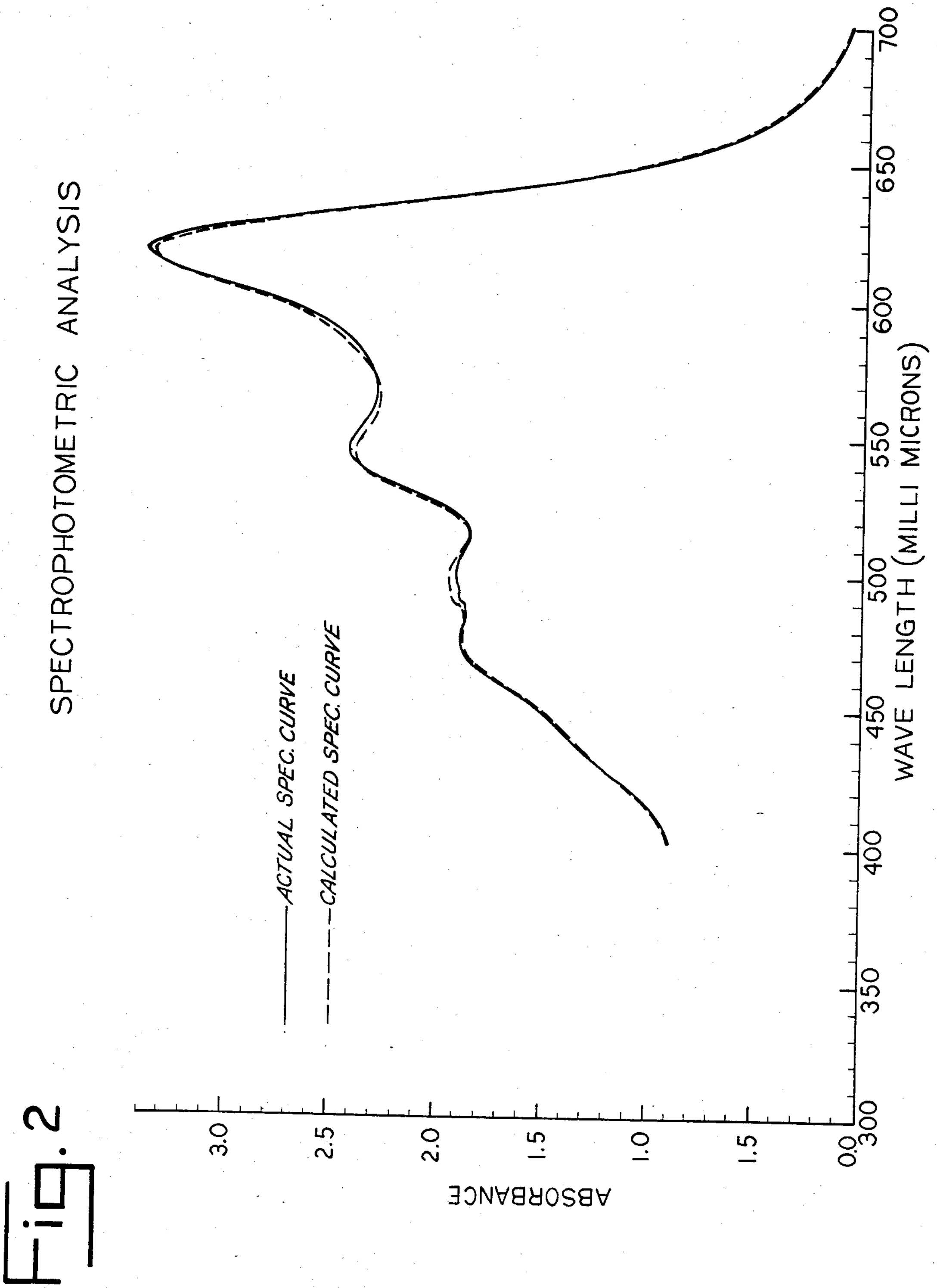
FIG. 2 displays the spectrophotometric analysis in the visible range of the preferred embodiment disclosed in Example 2.

As shown in FIG. 2, the liquid marking composition showed absorbance throughout the visible range upon spectrophotometric analysis. Similar tests have been performed with 2'-t-butyl, 6'-diethyl amino fluoran and 6'-diethyl amino, 3'-methyl fluoran yielding similarly satisfactory results. Thus, the inventive chromogenic mixtures form "black" images of suitable commercial intensity when imaged against CF sheets coated with zinc-modified phenolic resins.

It is to be understood that the above description of the preferred embodiments is not intended to limit the scope of the present invention. Rather, many embodiments not specifically discussed above fall within the spirit of the invention and scope of the claims that follow.

We hereby claim as our invention:

1. A chromogenic mixture comprising:

(a) approximately 10% to 60% by weight of an orange chromogen having the following formula:

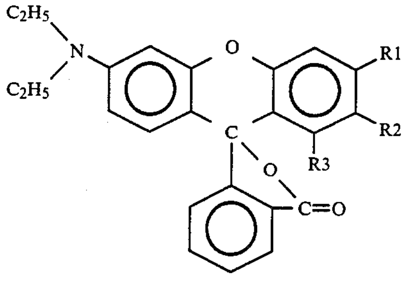

where R1, R2, and R3 are alkyl groups having 1–5 carbon atoms or hydrogen or combinations thereof;

(b) approximately 5% to 60% by weight of a blue, indigo or violet chromogen; and (c) approximately 30% to 70% by weight of a green or single component black chromogen.

2. The chromogenic mixture of claim 1 wherein the blue, indigo, or violet chromogen is selected from the group consisting of crystal violet lactone, 6-dimethylamino, bis(3-dimethylaminophenyl, 1,3, dimethylaminophenyl)phthalide and 1',3',6',8' tetra(dimethylaminophenyl)phthalide.

3. The chromogenic mixture of claim 1 wherein the green or single component black chromogen is selected from the group consisting of 2'(N-methyl, N-phenylamino), 6'-(N-ethyl, N-p-tolylamino) fluoran; 2'-(phenylamino), 3'-methyl, 6'-(N-ethyl, N-p-tolylamino)fluoran; 2'-(bis-phenyl methylamino), 4'-methyl, 6'-diethylamino fluoran; and 2'-phenylamino, 3'-methyl, 6'(N-methyl, N-cyclohexylamino)fluoran.

4. The chromogenic mixture of claim 1 wherein the orange chromogen has R1 and R3 as methyl groups and R2 as hydrogen and is present in an amount of approximately 35% by weight; the blue, indigo or violet dye is crystal violet lactone and is present in an amount of approximately 20% by weight; and the green or single component black chromogen is 2'(N-methyl, N-phenylamino), 6'-(N-ethyl, N-p-tolylamino)fluoran and is present in an amount of approximately 45% by weight.

5. The chromogenic mixture of claim 1 wherein the orange chromogen has R1 and R3 as methyl groups and R2 as hydrogen and is present in an amount of approximately 24% by weight, the blue, indigo or violet chromogen is crystal violet lactone and is present in an amount of approximately 16% by weight, and the green or single component black chromogen is 2'-(phenylamino), 3'-methyl, 6'-(N-ethyl, N-p-tolylamino)-fluoran and is present in an amount of approximately 60% by weight.

6. A substantially colorless but colorable marking liquid composition comprising an organic oil solution having a chromogenic mixture dissolved therein, the chromogenic mixture comprising:

(a) approximately 10% to 60% by weight of an orange chromogen having the following formula:

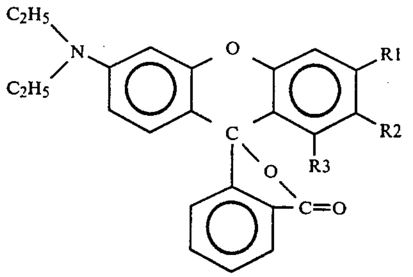

where R1, R2, and R3 are alkyl groups having 1–5 carbon atoms or hydrogen or combinations therof;

(b) approximately 5% to 60% by weight of a blue, indigo or violet chromogen; and (c) approximately 30% to 70% by weight of a green or single component black chromogen;

wherein said chromogenic mixture is present in an amount sufficient to form color.

7. The marking liquid composition of claim 6 wherein the blue, indigo, or violet chromogen is selected from the group consisting of crystal violet lactone, 6-dimethylamino, bis(3-dimethylaminophenyl, 1,3 dimethylaminophenyl)phthalide and 1',3',6',8' tetra(dimethylaminophenyl)phthalide.

8. The marking liquid composition of claim 6 wherein the green or single component black chromogen is selected from the group consisting of 2'(N-methyl, N-phenylamino), 6'-(N-ethyl, N-p-tolylamino)fluoran; 2'-(phenylamino), 3'-methyl, 6'-(N-ethyl, N-p-tolylamino)-fluoran; 2'-(bis-phenyl methylamino), 4'-methyl, 6'-diethylamino fluoran; and 2'-phenylamino, 3'-methyl, 6'(N-methyl, N-cyclohexylamino)fluoran.

9. The marking liquid composition of claim 6 wherein the orange chromogen has R1 and R3 as methyl groups and R2 as hydrogen and is present in an amount of approximately 35% by weight; the blue, indigo or violet dye is crystal violet lactone and is present in an amount of approximately 20% by weight; and the green or single component black chromogen is 2'(N-methyl, N-phenylamino), 6'-(N-ethyl, N-p-tolylamino)fluoran and is present in an amount of approximately 45% by weight.

10. The marking liquid composition of claim 6 wherein the orange chromogen has R1 and R3 as methyl groups and R2 as hydrogen and is present in an amount of approximately 24% by weight; the blue, indigo or violet chromogen is crystal violet lactone and is present in an amount of approximately 16% by weight; and the green or single component black chromogen is 2'-(phenylamino), 3'-methyl, 6'-(N-ethyl, N-p-tolylamino)fluoran and is present in an amount of approximately 60% by weight.

* * * * *